Feb. 28, 1928. 1,661,089
F. QUINN
MACHINE FOR CLEANING COTTON, COTTON WASTE, AND LIKE FIBROUS MATERIALS
Filed Dec. 19, 1923
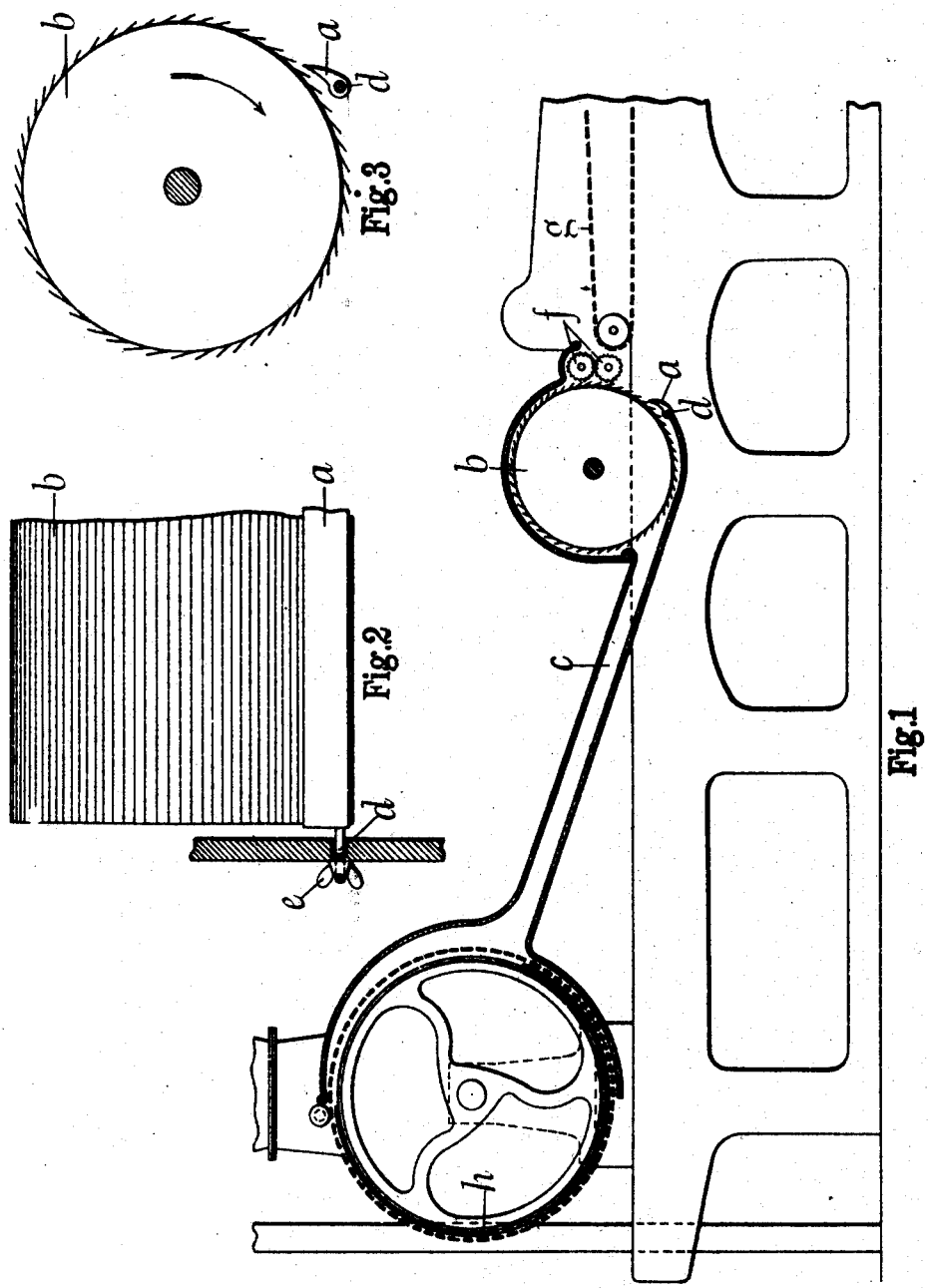
Inventor
F. Quinn
By Marks & Clerk
Attys Patented Feb. 28, 1928.

1,661,089

UNITED STATES PATENT OFFICE.

FRANK QUINN, OF ELTON, BURY, ENGLAND.

MACHINE FOR CLEANING COTTON, COTTON WASTE, AND LIKE FIBROUS MATERIALS.

Application filed December 19, 1923, Serial No. 681,653, and in Great Britain August 31, 1923.

This invention relates to machines for cleaning cotton, cotton waste and like fibrous materials of the type in which the latter after being subjected to the combing and opening action of the usual saw tooth roll or cylinder is drawn by suction through a chute on to a revolving cage, a portion only of the periphery of which is open to the suction action, so that the dust and fine dirt is drawn into the cage whilst the fibrous material is carried forward around the cage and deposited in a suitable receptacle.

The object of my present invention is to provide for a more efficient separation of the foreign material from the fibrous material as the latter leaves the saw tooth roll and enters the suction chute.

Referring to the accompanying sheet of explanatory drawings:—

Figure 1 is a sectional elevation of a cleaning and combing machine having my invention applied thereto.

Figure 2 is a side elevation and Figure 3 an end elevation showing, to a larger scale than that of Figure 1, the dust separator or deflector arranged in association with the saw tooth roll or cylinder.

The same reference letters in the different views indicate the same parts.

In accordance with my invention, and as illustrated by the drawings, I provide an adjustable knife edge or blade as $a$ which extends across the width of the saw tooth roll or cylinder $b$ at a readily regulated distance therefrom and at the entrance to the chute $c$, Figure 1, so that any foreign matter (which by reason of the fine combing and opening of the fibers by the roll $b$ in conjunction with the feed rollers $f$), tends to be caught and deflected by said knife edge or blade and thrown clear of the roll $b$. It then falls into a receptacle provided therefor.

The said knife blade or like part $a$ forms the extreme end of the lower side of the suction chute $c$ as shown at Figure 1 and extends across the roll $b$, being normally set close to the periphery of said roll at the position indicated. The blade has end pins or gudgeons as $d$ supported in slots in the machine framing and fitted with wing nuts as $e$ to provide for the setting and fixing of the blade edge in the desired relationship to the roll or cylinder $b$. The slots aforesaid are of sufficient length to permit of adjusting movements of the gudgeons therein.

The feed to the saw tooth roll $b$ may be by the usual feed rollers as $f$, Figure 1, arranged in association with the lattice $g$. The machine is also provided with a revolving cage $h$ and other revolving ordinary elements employed in cleaning and combing machines of the type specified.

If desired I may employ more than one blade or deflector as $a$, the latter being then arranged one behind the other. The saw tooth roll $b$ is preferably made of considerably greater diameter than the similar licker-in or taker-in roll of the known type of machines and rotates at a much higher surface speed.

I claim:—

1. In a machine for cleaning fibrous materials, the combination of a suction chute having an entrance for fibrous materials, a high speed saw tooth roller arranged in the entrance of the chute, and an adjustable blade arranged adjacent the periphery of said roll and in close relation to the entrance of the chute whereby to concentrate the suction action of the chute in the vicinity of the blade, and feed rollers arranged adjacent the saw tooth roller and spaced from the blade whereby the fibers fed by the feed rollers are gripped by the saw teeth and their ends thrown outwards over the edge of the blade, straightening said fibers and separating solid material therefrom.

2. In a machine of the character described, a suction chute having an entrance for fibrous materials, a high speed saw tooth roller arranged in the entrance of the chute, a blade having a continuation of the chute and arranged to concentrate the suction action of the chute in the vicinity of the blade, and means for adjusting the angular relation of the blade to the suction chute whereby to vary the area of the entrance, and feed rollers arranged adjacent the saw tooth roller and spaced from the blade whereby the fibers fed by the feed rollers are gripped by the saw teeth and their ends thrown outwards over the edge of the blade, straightening said fibers and separating solid material therefrom.

3. In a machine for cleaning fibrous material the combination of a suction chute having an entrance for fibrous materials, a high speed saw tooth roller arranged in the entrance of the chute, and a relatively narrow blade arranged adjacent the periphery of said roller and in close relation to the entrance of the chute whereby to concentrate the suction action of the chute in the vicinity of the blade, said blade being arranged substantially tangential to said roller whereby incident to rotation of the latter the roller saw teeth throw the fibers outwardly over the edge of the blade to separate and straighten the fibers.

In testimony whereof I have signed my name to this specification.

FRANK QUINN.